Patented Mar. 2, 1943

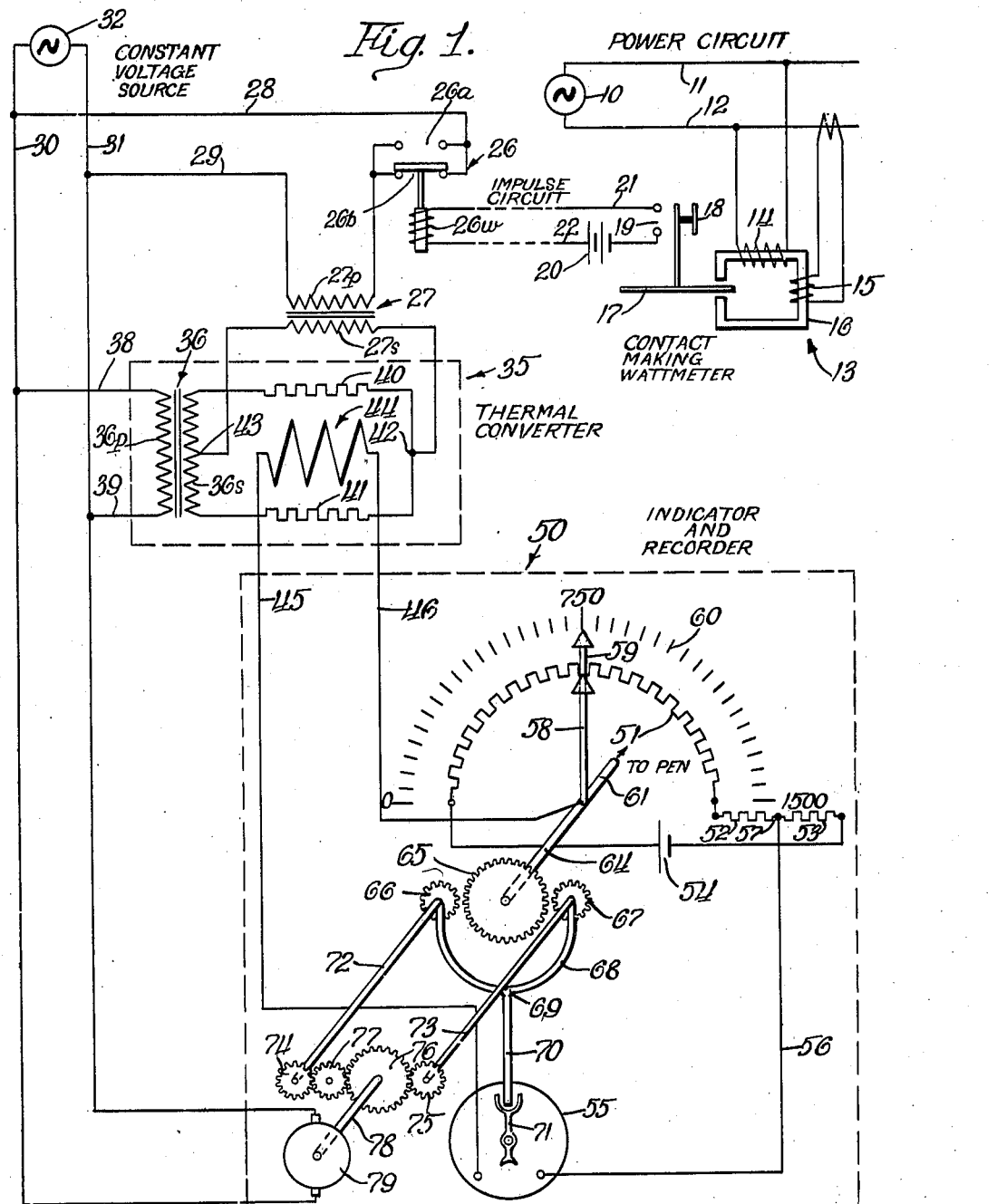

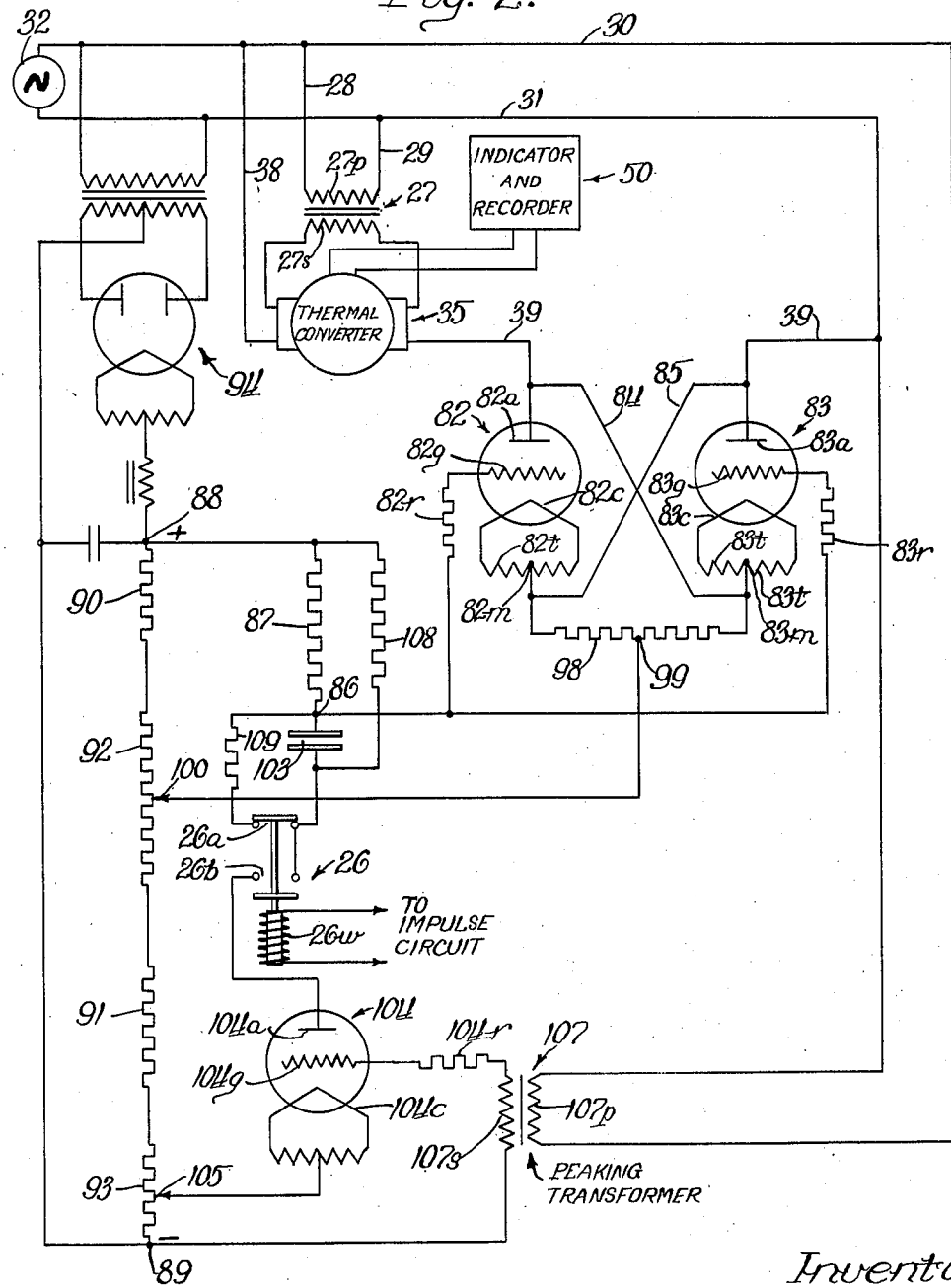

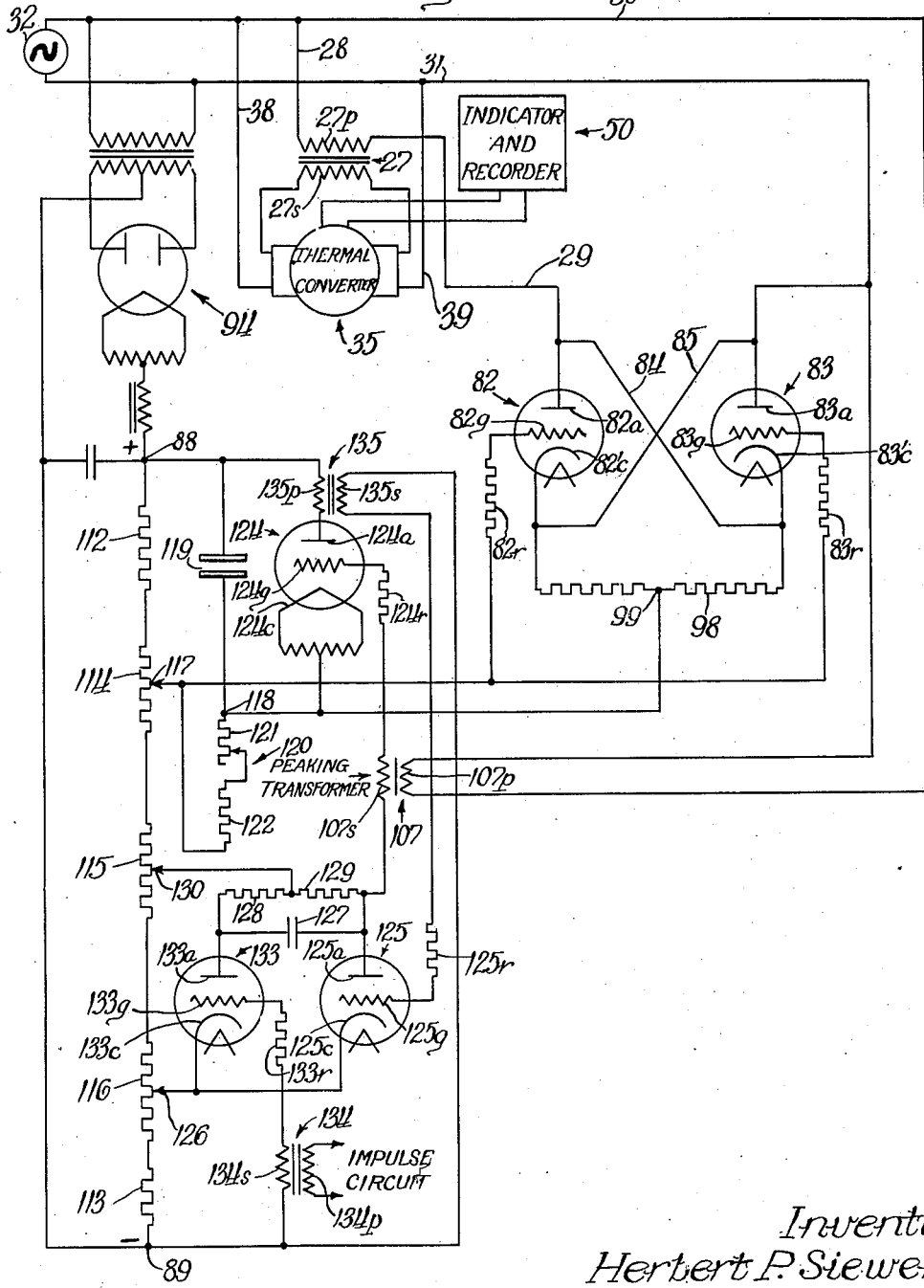

2,312,491

UNITED STATES PATENT OFFICE 2,312,491

REMOTE METERING SYSTEM

Herbert P. Siewert, Waukegan, Ill.

Application October 7, 1939, Serial No. 298,517

8 Claims. (Cl. 177—351)

My invention relates, generally, to electric power metering systems, and it has particular relation to remote metering systems in which a number of impulses is transmitted, the number being directly proportional to a variable quantity, such as the amount of electrical energy that is flowing in a power circuit.

An object of my invention is to generate heat in an amount which is proportional to the number of impulses and to measure the heat thus produced.

Another object of my invention is to generate heat in an amount which is proportional to the number of impulses and in turn to generate a voltage which is proportional to the heat produced and then to measure the voltage thus produced.

A further object of my invention is to reduce the amount of heat that is generated by a thermal converter in proportion to the number of impulses and to measure the varying quantity of heat.

Still another object of my invention is to normally continuously energize a thermal converter from an alternating current source and to reduce the current flowing to the thermal converter during periods each of which corresponds to an impulse.

A still further object of my invention is to make the periods of the same length regardless of the length of the individual impulses.

Other objects of my invention will, in part, be obvious and in part appear hereinafter.

My invention, accordingly, is disclosed in the embodiments thereof shown in the accompanying drawings, and it comprises the features of construction, combination of elements and arrangements of parts which will be exemplified in the circuit arrangements hereinafter set forth, and the scope of the application of which will be indicated in the appended claims.

For a more complete understanding of the nature and scope of my invention, reference may be had to the following detailed description, taken in connection with the accompanying drawings, in which:

Figure 1 illustrates diagrammatically a complete remote metering system of the impulse type in which the thermal converter is employed directly in conjunction with an impulse receiving relay;

Figure 2 illustrates diagrammatically how the thermal converter can be controlled by the use of electric valves under the control of the impulse receiving relay; and Figure 3 illustrates diagrammatically how the electric valves which are employed for controlling the thermal converter can be in turn controlled by additional electric valves without requiring the use of any moving parts, such as the impulse receiving relay.

Referring now particularly to Figure 1 of the drawings, it will be observed that the reference character 10 designates a source of alternating current, such as a 60-cycle source, which is arranged to energize a power circuit represented by the conductors 11 and 12. It will be understood that ordinarily transformers and switches will be interposed between the alternating current source 10 and the conductors 11 and 12, and that a three-phase rather than a single phase system is employed. However, for purposes of illustration, the power system may be represented diagrammatically, as shown.

The energy flowing in the power circuit can be measured by a contact-making wattmeter, shown generally at 13, and having voltage and current windings 14 and 15 which are connected to the power circuit conductors 11 and 12 in the usual manner, as illustrated. The windings 14 and 15 are positioned on a core 16 of laminations. The core 16 is generally C-shaped and between its ends a disc 17 of conducting material rotates at a speed which it will be understood is directly proportional to the energy flowing in the power circuit. Mounted for rotation with the disc 17 is a contact bridging member 18 that is arranged to bridge contact members 19 once during each revolution of the disc 17.

When the contact members 19 are bridged an impulse is applied from a suitable current source, such as a battery 20, to an impulse circuit comprising conductors 21 and 22. As shown, the conductors 21 and 22 forming the impulse circuit comprise continuous conductors from the impulse transmitter or contact-making wattmeter 13 located at the place where the power measurement is made, to a remote point where the indication of the amount of energy flowing in the power circuit is to be given. While a direct wire connection is shown it will be understood that various other arrangements may be employed, such as carrier current or radio waves, etc., for transmitting impulses from the point of origin thereof to the remote point, it only being necessary that the number of impulses received at the remote point correspond to the number of impulses transmitted which, in turn, is a function of the energy flowing in the power circuit represented by the conductors 11 and 12.

As shown in the drawing, the conductors 21 and 22 of the impulse circuit are connected to energize a winding 26w of an impulse-receiving relay which may be located at the remote point, such as a dispatcher's office, where an indication of the energy flowing in the power circuit represented by the conductors 11 and 12 is desired. The impulse receiving relay 26 is provided with normally open contact members 26a and normally closed contact members 26b. These contact members are arranged, as shown, to connect a primary winding 27p of a transformer, shown generally at 27, for energization by means of conductors 28 and 29 across conductors 30 and 31 which are energized from a constant voltage source 32 of alternating current. For proper operation of the impulse counting system which is presently to be described, it is preferable that the voltage of the source 32 be maintained substantially constant in order to insure greater accuracy. It will be understood that any suitable standard voltage regulator can be employed for maintaining the voltage of the source 32 that is applied to the conductors 30 and 31 at a value which is within the permissible limit of variation.

It will be apparent that, when the impulse circuit comprising the conductors 21 and 22 is deenergized, the primary winding 27p of the transformer is energized with alternating current. On receipt of an impulse the winding 26w is energized and contact members 26b are opened. Contact members 26a are momentarily closed, and then contact members 26b are again closed. During the time when neither of the sets of contact members 26a or 26b is closed, no current flows through the winding 27p. Thus the normally continuous flow of current through the primary winding 27p is interrupted to an extent which depends upon the number of times that the winding 26w is energized or the number of impulses that are received over the impulse circuit.

The variable output of the transformer 27 is applied by means of its secondary winding 27s to a thermal converter, shown generally at 35. The thermal converter 35 is what is known in the art as a Lincoln thermal converter and is ordinarily employed in connection with demand measurements in electric power circuits. When so employed, it is energized in accordance with the voltage across and the current flowing through a power circuit. According to the present invention, either the current or the voltage element of the thermal converter 35 is connected to be continuously and uninterruptedly energized while the other element is likewise normally so connected but is arranged to be deenergized each time that an impulse is received. Normally then, when no impulses are being received, the output of the thermal converter 35 is at a maximum. This maximum output is reduced under operating conditions in accordance with the number of impulses received.

The thermal converter 35 is provided with a potential transformer, shown generally at 36, which includes a primary winding 36p that is connected by conductors 38 and 39 to conductors 30 and 31, respectively, which are energized from the constant voltage source 32. The secondary winding 36s is connected, as shown, to resistors 40 and 41 which are commonly connected at 42, and to one terminal of the secondary winding 27s of the transformer 27. The other terminal of the secondary winding 27s is connected to a mid-tap 43 of the secondary winding 36s of the potential transformer 36. Thermocouples, shown generally at 44, are connected to be responsive to the heat that is generated by current flow through the resistors 40 and 41. The heat that is supplied to the thermocouples 44 causes a voltage to be generated which is a function of the heat and this voltage is applied across conductors 45 and 46. This voltage, which usually is of the order of millivolts and may be a maximum of 25 millivolts for one commercial size of the thermal converter 35 when both of the transformers 27 and 35 are continuously energized, will be corerspondingly reduced on receipt of impulses as a result of the operation of the impulse receiving relay 26. The amount that the voltage across the conductors 45 and 46 is reduced is a measure of the number of impulses received. It now remains to describe one manner in which the voltage across the conductors 45 and 46 can be measured.

An indicator and recorder, shown generally at 50, is of a standard type which is known on the market as a Leeds & Northrup indicator and recorder. It will be understood, of course, that any other suitable type of measuring apparatus may be employed, the particular type illustrated being shown for the purpose of demonstrating a conventional type of measuring apparatus which has been found to be well suited for use in connection with the present invention.

The indicator and recorder 50 is provided with a potentiometer 51 that is connected in series circuit relation with fixed resistors 52 and 53 and across a standard direct current source, such as a standard cell or battery 54. The conductor 45 from the thermocouples 44 of the thermal converter 35 is connected to one terminal of a galvanometer 55 while the other terminal thereof is connected by a conductor 56 to a common connection 57 between the fixed resistors 52 and 53. By balancing the voltage across the conductors 45 and 46 against the voltage of the standard cell 54 by means of the galvanometer 55, it is possible to measure the generated voltage with a high degree of accuracy. The balance is effected by moving a pointer 58, to which the conductor 46 is connected, along the potentiometer 51 until the two voltages are balanced, or until the current which tends to flow as a result of the voltage across the conductors 45 and 46 exactly balances the current which tends to flow from the standard cell 54 through the galvanometer 55. When such a condition exists, the galvanometer 55 is in the zero or balanced position.

It will now be apparent that the position of the arm 58 at which the balanced condition is reached is a measure, not only of the voltage across the conductors 45 and 46 that is generated by the thermocouples 44, but also that its position indicates the number of impulses that is being received. Since the number of impulses is a function of the energy that is flowing in the power circuit, represented by the conductors 11 and 12, the position of the arm 58 also indicates this amount of energy. Accordingly, the arm 58 can be provided with a pointer extension 59 for cooperating with a calibrated scale 60. The scale 60 may be calibrated in any suitable units. For example, it may be calibrated from zero to 1500 megawatts. This scale may then indicate the energy output of a single power station or, with a suitable totalizing arrangement, it may indicate the energy output of a number of power stations in a system.

With a view to providing a permanent record of the variations in energy with respect to time, a shaft extension 61 may be provided which, through a suitable mechanism, can be arranged to operate a pen which traces a line on a constantly moving time chart, as will be readily understood.

Any suitable means can be provided for moving the arm 58 into the balanced position. For example, the arm 58 may be mounted on a shaft 64 which carries a gear wheel 65 that is arranged to have moved into engagement therewith either pinion 66 or pinion 67. The pinions 66 and 67 can be carried on a yoke 68 that is pivoted at 69 and has a depending arm 70 which is arranged to be moved in one direction or the other by the pointer 71 of the galvanometer 55. The pinions 66 and 67 are carried by shafts 72 and 73 which also carry at their opposite ends pinions 74 and 75. A gear wheel 76 is arranged to drive pinion 75 while the pinion 74 is driven through an idler pinion 77, in order to cause the pinions 74 and 75 to rotate in opposite directions. The gear wheel 76 is carried by a shaft 78 that is rotated continuously by a motor 79 of any suitable type that can be connected for energization across the conductors 30 and 31.

It will be understood that the pinions 66 and 67 continuously rotate in opposite directions and that they are arranged to selectively engage the gear wheel 65 in accordance with the position of the galvanometer pointer 71. The arm 58 will be correspondingly moved in one direction or the other in order to restore the balanced condition. The position of the pointer extension 59 with respect to the scale 60 will then indicate at all times the energy that flows in one or more power circuits, as represented by the number of impulses received.

In Figure 2 of the drawings I have illustrated another embodiment of the invention which, in some respects, is preferable to the embodiment disclosed in Figure 1 and described hereinbefore. The embodiment of the invention shown in Figure 2 makes use of the thermal converter 35 and the indicator and recorder 50, which have been previously shown and described in detail. Accordingly, in Figure 2 they are illustrated diagrammatically. Also in the embodiment shown in Figure 2 of the drawings, the current flow through the potential transformer 36 is reduced each time that an impulse is received, while the current flow through the transformer 27 is maintained constant.

Instead of employing a mechanical switch for controlling the flow of current to the potential transformer of the thermal converted 35, a pair of electric valves 82 and 83 is provided and connected in the conductor 39, as shown, so as to conduct succeeding half-cycles of the alternating current. The valves 82 and 83 are preferably of the thyratron type and are provided, respectively, with anodes 82a and 83a, control electrodes 82g and 83g, and hot cathodes 82c and 83c. The cathodes 82c and 83c may be energized in any suitable manner, such as by low voltage transformers, the secondary windings 82t and 83t only being shown. A conductor 84 is provided for interconnecting the anode 82a and the mid-point 83m of the secondary winding 83t while a conductor 85 connects anode 83a with the mid-point 82m of the secondary winding 82t as is customary.

Under normal operating conditions, when no impulses are being received, the valves 82 and 83 are conducting by having the control electrodes 82g and 83g biased positive with respect to the respective cathodes 82c and 83c. As shown, the control electrodes 82g and 83g are connected through resistors 82r and 83r to one terminal 86 of a control resistor 87, the other terminal of which is connected to the positive terminal 88 of a suitable direct current source. The negative terminal of the direct current source is indicated at 89 and between these terminals are connected fixed resistors 90 and 91 and potentiometers 92 and 93. It will be understood that any suitable source of direct current may be connected across the terminals 88 and 89. A battery can be employed, if desired. For illustrative purposes the electronic rectifier, shown generally at 94, has been provided. Since this is a conventional arrangement, it will not be described in detail.

With a view to employing only a single source of biasing potential for the control electrodes 82g and 83g, a resistor 98, having a relatively high resistance, is interconnected between the mid-points 82m and 83m of the secondary windings 82t and 83t, and its mid-point 99 is connected by the adjustable pointer 100 to the resistor 92. With the arrangement thus far described it will be apparent that a positive biasing voltage will be applied to the control electrodes 82g and 83g and that the valves 82 and 83 will conduct successive half-cycles of the alternating current, or will function in the manner of a closed switch.

For each impulse that is received over the impulse circuit, the electric valves 82 and 83 are rendered non-conducting for a period the length of which is determined by the time that is required to charge a capacitor 103. Since each period during which the electric valves 82 and 83 are non-conducting corresponds to an impulse, it will be apparent that the functioning is essentially the same as that described hereinbefore when the circuit is opened for each impulse directly by means of the impulse receiving relay 26.

The charging of the capacitor 103 is initiated by the closure of contact members 26b of the impulse receiving relay 26 which, it will be recalled, is operated by energization of its winding 26w each time that an impulse is received. The circuit for charging the capacitor 103 extends through a control valve, shown generally at 104, which is preferably of the thyratron type, the anode 104a being connected to one of the contact members 26b while the cathode 104c is connected by the adjustable pointer 105 to the potentiometer 93. Normally the control valve 104 is maintained in the non-conducting state by applying a negative biasing potential to its control electrode 104g from the terminal 89 of the direct current source through the resistor 104r. The negative biasing potential on the control electrode 104g is overcome by means of a peaking transformer, shown generally at 107, the primary winding 107p of which is connected for energization across the conductors 30 and 31, while the secondary winding 107s is connected in the circuit to the control electrode 104g, as shown. The peaking transformer 107 is arranged to apply to the control electrode 108g a peaked control potential which, in alternate half-cycles, is sufficient to overcome the negative potential normally applied thereto and to render the valve 104 conducting. However, the valve 104 remains in the non-conducting state normally because the contact member 26b of the impulse receiving relay 26 are normally open. The peaked wave control potential is employed in order to more accurately determine when the control valve 104 shall be rendered conducting and also the time at which the capacitor 103 begins to receive its charge. Therefore, it will be understood that while the charging circuit for the capacitor 103 is closed at contact members 26b when an impulse is received, the charging is not initiated until the control valve 104 is rendered conducting by the application of the peaked control potential to the control electrode 104g. Since the peaking transformer 107 is energized from the same constant voltage source 32 that energizes the thermal converter 35, the initiation of the charging of the capacitor 103 will always take place at the same instant in a half cycle of the alternating current.

As soon as the capacitor 103 begins to charge, current flows through the control resistor 87 and the terminal 86 thereof becomes negative relative to the terminal 88 of the direct current source. The resistance of the resistor 87 and the current flow for charging the capacitor 103 are such that the potential of the terminal 86 becomes more negative than is the potential of the adjustable pointer 100 of the potentiometer 92. Since the control electrodes 82g and 83g of the valves 82 and 83 are connected to the terminal 86, they are now biased at a potential which is more negative than is the potential of the cathodes 82c and 83c and, consequently, the valve 82 or 83 which is conducting at the instant that the capacitor 103 begins to charge, ceases to conduct at the end of that half cycle and it and the other valve are rendered non-conducting as long as the control electrodes 82g and 83g remain at a negative potential with respect to their cathodes 82c and 83c. This time is determined by the time that is required to charge the capacitor 103 which is a function of the product of the resistance of the resistor 87 and the capacitance of the capacitor 103. When the capacitor 103 is charged to a predetermined potential, the potential of the terminal 86 again becomes positive with respect to the potential of the pointer 100 and at that instant in a half cycle one or the other of the valves 82 or 83 is rendered conducting, depending upon the polarity of the half cycle.

With a view to insuring that the control valve 104 will be rendered conducting, a resistor 108 is shunted around the control resistor 87 and the capacitor 103 to provide a complete circuit.

On the termination of the impulse the winding 26w of the impulse receiving relay is deenergized and contact members 26b are opened, while contact members 26a are closed, to connect a shunting resistor 109 around the capacitor 103 for discharging the same. The system is then in condition for receiving the next impulse.

In the system shown in Figure 2 of the drawings it is necessary that the capacitor 103 complete its charging cycle while the contact members 26b of the impulse receiving relay 26 are held closed. The length of the impulse, to a certain extent, then controls the functioning of the system. While the number of impulses is to be totalized, it is desirable, for obvious reasons, to have the periods during which the valves 82 and 83 are rendered non-conducting be identical in length. Therefore, it is essential that the length of the impulse that is received be longer than the non-conducting period of the valves 82 and 83 in each instance. While it is readily possible to provide for such an arrangement, it is desirable to employ a system which is dependent only upon receipt of an impulse and is entirely independent of the length of the received impulse.

In Figure 3 of the drawings an embodiment of the invention is illustrated which does not depend for its proper functioning upon the length of the received impulses. It is controlled solely in accordance with the number of impulses received and is independent of the length thereof. As before, electric valves 82 and 83 are provided for controlling the energy that is supplied to the thermal converter 35. It will be observed that in the embodiment of the invention shown in Figure 3 the current flow through the primary winding 27p of the transformer 27 is varied, while the current flowing through the conductors 38 and 39 to the potential transformer is fixed.

The direct current control voltage may be obtained, as previously described, from any suitable source such as an electronic rectifier 94, the control voltage being applied between terminals 88 and 89. As shown, these terminals are interconnected by fixed resistors 112 and 113 and potentiometers 114, 115 and 116.

The valves 82 and 83 are normally rendered conducting by having their control electrodes 82g and 83g biased to a positive potential. They are connected to the adjustable pointer 117 at a point along the potentiometer 114 which is positive with respect to a terminal 118, to which is connected the mid-point 99 of the resistor 98 which interconnects the indirectly heated cathodes 82'c and 83'c.

A normally fully charged capacitor 119 is connected between the positive terminal 88 of the direct current source and the terminal 118, so that the potential of the latter is negative with respect to the potential of the pointer 117. Connected between the terminal 118 and the pointer 117 is a resistor, shown generally at 120, which is made up of an adjustable section 121 and a fixed section 122. It will be understood that the time required to charge the capacitor 119 is a function of the product of its capacitance and the resistance of the resistor 120. The manner in which the capacitor 119 is discharged and charged will be presently set forth.

As indicated, the capacitor 119 is normally charged when no impulses are being received. A shunting valve, shown generally at 124, is provided for discharging the capacitor 119. This valve is preferably of the thyratron type and has an anode 124a, a control electrode 124g, and a hot cathode 124c. Normally the shunting valve 124 is maintained in the non-conducting state by means of a lockout valve, shown generally at 125, which is normally in the conducting state. The lockout valve 125 is preferably of the thyratron type and it includes an anode 125a, a control electrode 125g, and an indirectly heated cathode 125c. As shown, the cathode 125c is connected to a pointer 126 that is movable along the potentiometer 116. The circuit for the lockout valve 125 is completed through a capacitor 127 and resistors 128 and 129 to a pointer 130 along the potentiometer 115.

A start valve, shown generally at 133 and preferably of the thyratron type, is provided having an anode 133a, a control electrode 133g, and an indirectly heated cathode 133c that is connected to the pointer 126. Normally the start valve 133 is non-conducting. It is rendered conducting on receipt of an impulse from the impulse circuit by means of an impulse transformer, shown generally at 134. It will be observed that the primary winding 134p is connected to the impulse circuit while the secondary winding 134s is connected to the negative terminal 89 of the direct current source and through resistor 133r to the control electrode 133g.

On receipt of an impulse from the impulse circuit, a potential is induced in the secondary winding 134s of the impulse transformer 134 which is sufficiently positive to overcome the normally negative potential applied to the control electrode 133g and the start valve 133 then becomes conducting. The charge on the capacitor 127 is then reversed and the lockout valve 125 is rendered non-conducting. As a result, the potential of the control electrode 124g of the shunting valve 124 becomes less negative, since it is now connected to the adjustable pointer 130 rather than through the lockout valve 125 to the adjustable pointer 126. However, this reduction in negative potential applied to the control electrode 124g is not in itself sufficient to render the shunting valve 124 conducting. It remains for the peaking transformer 107 to apply the necessary positive control potential to the control electrode 124g for rendering the shunting valve 124 conducting at the desired instant in a half cycle for the reasons set forth hereinbefore. It will be observed that the primary winding 107p of the peaking transformer 107 is connected for energization across the conductors 30 and 31, while the secondary winding 107s is connected through the resistor 124r to the control electrode 124g.

When the shunting valve 124 is rendered conducting, the capacitor 119 is immediately discharged therethrough. In the uncharged condition the capacitor 119 acts as a short circuit between the terminal 118 and the terminal 88 of the direct current source. As a result, control electrodes 82g and 83g of the valves 82 and 83 have applied thereto a negative potential and these valves are thereupon rendered non-conducting. The time during which they remain in the non-conducting state is controlled by the time that is required to recharge the capacitor 119.

Another result of the discharge of the capacitor 119 is to extinguish the shunting valve 124 because of the short circuit that is placed around it. It is maintained in this condition as a result of the lockout valve 125 again becoming conducting. This is effected by the provision of a transformer 135, the primary winding 135p of which is connected between the anode 124a and the terminal 88 of the direct current source. The secondary winding 135s of the transformer 135 is connected in the circuit to the control electrode 125g through the resistor 125r. The current flowing through the primary winding 135p on discharge of the capacitor 119 induces a voltage in the secondary winding 135s which is sufficient to overcome the negative potential that is normally applied to the control electrode 125g and as a result the lockout valve 125 again becomes conducting. Thereupon the control electrode 124g of the shunting valve 124 has applied thereto a negative biasing potential from the pointer 126 along the resistor 116 and this valve is maintained in the non-conducting state.

Another result of the lockout valve 125 becoming conducting is to render the start valve 133 non-conducting because of the reversal of the charge on the capacitor 127.

It will now be obvious that the length of the impulse that is applied to the primary winding 134p of the impulse transformer 134 is of no consequence, since the receipt of an impulse of any length is sufficient to fire the start valve 133. The subsequent cycle of operations which take place is entirely independent of the length of the impulse.

Since certain further changes can be made in the foregoing circuit arrangements and different embodiments of the invention can be made without departing from the scope thereof, it is intended that all matter contained in the above description or shown in the accompanying drawings shall be interpreted as illustrative and not in a limiting sense.

I claim as my invention:

1. A telemetering system comprising, in combination, a transmitter for sending impulses at a rate per unit time which is determined by a variable to be transmitted; a multiplying device having means responsive to two electrical characteristics and means for measuring the product of said characteristics; means for maintaining both of said characteristics substantially constant, and means for reducing one of said characteristics from its otherwise constant value in accordance with the rate per unit time that said impulses are received.

2. A telemetering system comprising, in combination, a transmitter for sending impulses at a rate per unit time which is determined by a variable to be transmitted; a multiplying device having means responsive to two electrical characteristics and means for measuring the product of said characteristics; means for maintaining both of said characteristics substantially constant, and a relay controlled by said impulses for reducing one of said characteristics from its otherwise constant value in accordance with the rate per unit time that the relay receives the impulses.

3. A telemetering system comprising, in combination, a transmitter for sending impulses at a rate per unit time which is determined by a variable to be transmitted; a multiplying device having means responsive to two electrical characteristics and means for measuring the product of said characteristics; means for maintaining both of said characteristics substantially constant including circuit means directly connected to an alternating current source and additional circuit means connected through electric valve means to said source, means for maintaining said electric valve means in the conducting state, and means for rendering said electric valve means non-conducting in accordance with the rate per unit time that said impulses are received.

4. A telemetering system comprising, in combination, a transmitter for sending electrical impulses at a rate per unit time which is determined by a variable to be transmitted; a thermal converter having means responsive to two variable electrical characteristics and thermal means for measuring the product of said characteristics; means for maintaining one of said characteristics substantially constant, and means for changing the other characteristic in accordance with the rate per unit time that said impulses are received.

5. A telemetering system comprising, in combination, a transmitter for sending electrical impulses at a rate per unit time which is determined by a variable to be transmitted; a thermal converter having means responsive to two variable electrical characteristics and thermal means for measuring the product of said characteristics; means for maintaining both of said characteristics substantially constant, and means for reducing one of said characteristics from its constant value in accordance with the rate per unit time that said impulses are received.

6. A telemetering system comprising, in combination, a transmitter for sending electrical impulses at a rate per unit time which is determined by a variable to be transmitted; a thermal converter having means responsive to two variable electrical characteristics and thermal means for measuring the product of said characteristics; means for maintaining both of said characteristics substantially constant, and a relay controlled by said impulses for reducing one of said characteristics from its constant value in accordance with the rate per unit time that the relay receives the impulses.

7. A telemetering system comprising, in combination, a transmitter for sending electrical impulses at a rate per unit time which is determined by a variable to be transmitted; a thermal converter having means responsive to two variable electrical characteristics and thermal means for measuring the product of said characteristics; means for maintaining one of said characteristics substantially constant, electric valve means for controlling the other characteristic, and means for controlling the conductivity of said electric valve means in accordance with the rate per unit time that said impulses are received.

8. A telemetering system comprising, in combination, a transmitter for sending electrical impulses at a rate per unit time which is determined by a variable to be transmitted; a thermal converter having means responsive to two variable electrical characteristics and thermal means for measuring the product of said characteristics; means for maintaining both of said characteristics substantially constant including circuit means directly connected to an alternating current source and additional circuit means connected through electric valve means to said source, means for maintaining said electric valve means in the conducting state, and means for rendering said electric valve means non-conducting in accordance with the rate per unit time that said impulses are received.

HERBERT P. SIEWERT.